United States Patent
Taga et al.

[11] Patent Number: 5,854,548
[45] Date of Patent: Dec. 29, 1998

[54] ELECTRICAL ANGLE DETECTING DEVICE AND SYNCHRONOUS MOTOR DRIVE DEVICE

[75] Inventors: Yoshiaki Taga, deceased, late of Tokorozawa; Shigeo Taga, heir; Takiko Taga, heiress, both of Tokorozawa; Tomoyo Taga, heiress, Nagoya; Yasutomo Kawabata, Aichi-gun, all of Japan

[73] Assignee: Toyota Jidosha Kabushiki Kaisha, Toyota, Japan

[21] Appl. No.: 807,633

[22] Filed: Feb. 27, 1997

[30] Foreign Application Priority Data

Feb. 29, 1996 [JP] Japan ................................. 8-071508

[51] Int. Cl.$^6$ ........................................................ H02P 6/16
[52] U.S. Cl. ............................................ 318/721; 318/254
[58] Field of Search ................................... 318/138, 254, 318/439, 700, 720, 721, 722, 724

[56] References Cited

U.S. PATENT DOCUMENTS

| | | |
|---|---|---|
| 5,051,680 | 9/1991 | Belanger et al. . |
| 5,254,914 | 10/1993 | Dunfield et al. ...................... 318/254 |
| 5,448,149 | 9/1995 | Ehsani et al. ......................... 318/701 |
| 5,565,752 | 10/1996 | Jansen et al. ......................... 318/807 |
| 5,569,994 | 10/1996 | Taylor et al. ......................... 318/700 |
| 5,608,300 | 3/1997 | Kawabata et al. . |

FOREIGN PATENT DOCUMENTS

| | | |
|---|---|---|
| 4-312382 | 11/1992 | Japan . |
| 4-312391 | 11/1992 | Japan . |
| 5-10039 | 2/1993 | Japan . |
| 7-177788 | 7/1995 | Japan . |

OTHER PUBLICATIONS

The Semiconductor Power Conversion (SPC) Meeting, 1990, Japan. SPC 90–21, pp. 87–94, with English Abstract.

N.M. Mvungi, et al., European Power Electronics and Applications, vol. 4, pp. 390–393, "Sensorless Rotor Position Detection in an SR Motor", 1991.

Primary Examiner—Bentsu Ro
Attorney, Agent, or Firm—Oblon, Spivak, McClelland, Maier & Neustadt, P.C.

[57] ABSTRACT

An electrical angle detecting device for detecting the electrical angle of a synchronous motor utilizes differences in inductance between phases with the angle of a rotor 50 to determine electrical angle. Voltage is applied across predetermined phases, the currents Iu, Iv, Iw flowing through U, V, W phases as a function of the differing inductance with angle of the rotor 50 are simultaneously detected, and the electrical angle is determined from relationships among the three currents stored in memory beforehand. In a first stage, the electrical angle is determined in the 0–π range or the π–2π range by an approximation calculation and in a second stage the asymmetry of the maximum currents produced by the voltage applied across the phases is utilized to ascertain the range in which the electrical angle falls. the electrical angle can thus be unambiguously ascertained to enable sensorless detection of rotor position (electrical angle) even when the rotor is at rest or is rotating slowly.

10 Claims, 13 Drawing Sheets

| POSITIVE VOLTAGE PHASE CURRENT Iu | NEGATIVE VOLTAGE PHASE CURRENT ABSOLUTE VALUE Iv | NEGATIVE VOLTAGE PHASE CURRENT ABSOLUTE VALUE Iw | ANGLE $\theta$ |
|---|---|---|---|
| 100 | 10 | 20 | 10 |
| 90 | 20 | 10 | 20 |
| 80 | 30 | 5 | 30 |
| 70 | 35 | 2 | 40 |
| 65 | 38 | 2 | 50 |
| 60 | 40 | 5 | 60 |
| 55 | 41 | 10 | 70 |
| 50 | 41 | 20 | 80 |
| ⋮ | ⋮ | ⋮ | ⋮ |

ELECTRICAL ANGLE DETECTING DEVICE AND SYNCHRONOUS MOTOR DRIVE DEVICE

BACKGROUND OF THE INVENTION

1. Field of the Invention

This invention relates to an electrical angle detecting device for detecting electrical angle in a synchronous motor and a synchronous motor drive device employing the electrical angle detecting device.

2. Description of the Related Art

To enable precise detection of electrical angle in a synchronous motor with the rotor either at rest or rotating at low speed, the present assignee earlier proposed a device which detects the behavior of current flowing through the motor windings and determines the electrical angle based on the detected behavior (see Japanese Laying Open Gazette No. 7-177788). This electrical angle detecting device was developed based on the knowledge that, in a synchronous motor with three phases, for example, electrical angle can be unambiguously determined at least in the range of 0 to $\pi$ or $\pi$ to $2\pi$ by detecting the current behavior in any two of the phases. Moreover, determination of electrical angle does not require detection of current value in all of the polyphase windings but can be achieved in a three-phase synchronous motor, for example, by detecting the current of two phases.

While this electrical angle detecting device is excellent in ability to detect electrical angle accurately even when the rotor is at rest or is rotating at low speed, a synchronous motor sometimes produces unusual noise during detection by this type of electrical angle detecting device. This problem will now be examined in detail. This earlier electrical angle detecting device conducts measurement while voltage is successively applied across different winding phases. Specifically, as shown in FIGS. 17A and 17B, at prescribed timing while the synchronous motor is being driven by passage of currents Iu, Iv and Iw through the U phase, V phase and W phase, voltage is first applied across the U–VW phases and current passing through the U phase is measured (at time point m1 in FIG. 17B), voltage is next applied across the V–WU phases and current passing through the V phase is measured (time point m2), and voltage is lastly applied across the W–UV phases and current passing through the W phase is measured (time point m3). Since the sum of the currents passing through the three phases is zero, two current sensors (for the U and V phases, for example) are sufficient. The current of the W phase is calculated based on the current of the U and V phases.

When electrical angle detection involves this type of cyclic measurement of the phase currents as voltage is applied across prescribed phases, several milliseconds comes to be required for detecting the electrical angle. In order to ensure a satisfactory level of electrical angle measurement accuracy, moreover, the electrical angle must be measured once every ten or so milliseconds. Because of this, as shown in FIG. 17, measurement current is passed over a period of several milliseconds every ten or so milliseconds. This is thought to be the source of the unusual noise. Since the measurement is conducted at multiple times, moreover, the time points of the U-phase and W-phase measurements are separated by several milliseconds. This degrades the electrical angle measurement accuracy.

SUMMARY OF THE INVENTION

This invention was accomplished for overcoming the aforesaid drawbacks of the prior-art electrical angle detecting device and is aimed at achieving suppression of unusual noise generation and improvement of detection accuracy while taking advantage of the merits of the electrical angle measurement described in the foregoing.

A first electrical angle detecting device according to the invention for achieving this object is an electrical angle detecting device of a synchronous motor whose rotor is driven to rotate by interaction between a magnetic field produced by windings upon passage of polyphase currents therethrough and a magnetic field produced by permanent magnets, comprising:

memory means for storing in advance relationships between electrical angle and behavior of currents passing through polyphase windings in response to a prescribed voltage applied to a combination of the polyphase windings through which currents pass, voltage applying means for applying the voltage to the combination, current behavior detecting means for detecting the behavior of the current passing through each polyphase winding in response to the voltage applied by the voltage applying means, and electrical angle computing means for determining the electrical angle of the motor between 0 and $2\pi$ based on the behavior of the currents in the windings detected by the current behavior detecting means by referring to the relationships stored in the memory means.

Since with this configuration the voltage application and current detection with respect to the combination of polyphase windings need be conducted only once, generation of unusual noise is suppressed. Since no time-lapse induced error arises in the electrical angle measurement, moreover, improved measurement accuracy can be achieved.

In the electrical angle detecting device, the voltage applying means can be means for applying voltage of a magnitude smaller than that which produces current causing the windings to magnetically saturate in a prescribed time period and the current behavior detecting means can be provided with range ascertaining means for ascertaining in which of ranges $0$–$\pi$ and $\pi$–$2\pi$ the electrical angle falls and with electrical angle determining means for unambiguously determining the electrical angle in the range from 0 to $2\pi$ from the detected current behavior and a result of ascertaining by the range ascertaining means.

When the relationship between the windings and the permanent magnets provided on the rotor in the 0–$\pi$ range and that in $\pi$–$2\pi$ range are completely symmetrical, the measured phase currents in the prescribed combination of polyphase windings through which current passes may be totally identical at two points in the range of electrical angles between 0 and $2\pi$. Since in this case the range ascertaining means of this electrical angle detecting device ascertains in which of the 0–$\pi$ and $\pi$–$2\pi$ ranges the electrical angle falls, the current electrical angle can be readily ascertained.

A second electrical angle detecting device according to the invention is an electrical angle detecting device of a synchronous motor whose rotor is driven to rotate by interaction between a magnetic field produced by windings upon passage of polyphase currents therethrough and a magnetic field produced by permanent magnets, comprising:

memory means for storing in advance relationships between electrical angle and behavior of currents passing through polyphase windings in response to a prescribed voltage applied to a combination of the polyphase windings through which currents pass, voltage applying means for applying the voltage to the combination for shorter than a time period required for a change in electrical angle of π, the time period being a function of an upper limit speed of the motor subjected to electrical angle detection, current behavior detecting means for detecting the behavior of the current passing through each polyphase winding in response to the applied voltage, angle detecting means for determining the electrical angle of the motor in a 0–π range or a π–2π range thereof based on the behavior of the currents in the windings detected by the current behavior detecting means by referring to the relationships stored in the memory means, range ascertaining means for at least once ascertaining in which of the 0–π range and the π–2π range the electrical angle falls, and electrical angle update means for determining an initial value of the electrical angle from the detected electrical angle and a result of ascertaining by the range ascertaining means in the range 0–2π and updating the current electrical angle using the electrical angle detected thereafter by the angle detecting means.

This electrical angle detecting device detects the electrical angle of the synchronous motor between 0 and π or between π and 2π and the range ascertaining means thereof at least once ascertains in which of these two ranges the electrical angle falls. The initial value of the electrical angle is thus determined. Thereafter electrical angle is updated to the current value using the electrical angle detected by the angle detecting means. After the range ascertaining means has ascertained the electrical angle range at least once, therefore, the range in which the electrical angle falls can be readily discriminated and the electrical angle can be accurately updated without ascertaining in which of the 0–π and π–2π ranges it falls.

A first electrical angle detecting method according to the invention is an electrical angle detecting method for detecting an electrical angle of a synchronous motor whose rotor is driven to rotate by interaction between a magnetic field produced by windings upon passage of polyphase currents therethrough and a magnetic field produced by permanent magnets. The method comprises the following steps:

(a) applying a prescribed voltage to a combination of polyphase windings of the synchronous motor through which currents pass and in advance storing in memory relationships between electrical angle and behavior of currents passing through the polyphase windings in response to the applied voltage, (b) applying the voltage to the combination, (c) detecting the behavior of the current passing through each polyphase winding in response to the applied voltage, and (d) determining the electrical angle of the motor between 0 and 2π based on the detected behavior of the currents in the windings by referring to the relationships stored in memory.

A second electrical angle detecting method according to the invention is an electrical angle detecting method for detecting an electrical angle of a synchronous motor whose rotor is driven to rotate by interaction between a magnetic field produced by windings upon passage of polyphase currents therethrough and a magnetic field produced by permanent magnets. The method comprises the following steps:

(A) applying a prescribed voltage to a combination of polyphase windings through which currents pass and in advance storing in memory relationships between electrical angle and behavior of currents passing through the polyphase windings in response to the applied voltage, (B) repeatedly applying the voltage to the combination for a time period shorter than that required for a change in electrical angle of π, the time period being a function of an upper limit speed of the motor subjected to electrical angle detection, (C) detecting the behavior of the current passing through each polyphase winding in response to the applied voltage, (D) determining the electrical angle of the motor in a 0–π range or a π–2π range thereof based on the detected behavior of the currents in the windings by referring to the relationships stored in memory, (E) at least once ascertaining in which of the 0–π range and the π–2π range the electrical angle falls, and (F) determining an initial value of the electrical angle from the detected electrical angleand a result of ascertaining by the range ascertaining means in the range 0–2π and updating the current electrical angle using the electrical angle detected thereafter.

A first synchronous motor drive device according to the invention is a drive device of a synchronous motor whose rotor is driven to rotate by interaction between a magnetic field produced by windings upon passage of polyphase currents therethrough based on an electrical angle of the rotor and a magnetic field produced by permanent magnets, comprising:

memory means for storing in advance relationships between electrical angle and behavior of currents passing through polyphase windings in response to a prescribed voltage applied to a combination of the polyphase windings through which currents pass, voltage applying means for applying the voltage to the combination, current behavior detecting means for detecting the behavior of the current passing through each polyphase winding in response to the voltage applied by the voltage applying means, electrical angle computing means for determining the electrical angle of the motor between 0 and 2π based on the behavior of the currents in the windings detected by the current behavior detecting means by referring to the relationships stored in the memory means.

torque command value inputting means for inputting a torque command value related to torque required of the synchronous motor, and current controlling means for controlling current passed through the polyphase windings based on the electrical angle determined by the electrical angle computing means and the input torque command value.

A second synchronous motor drive device according to the invention is a drive device of a synchronous motor whose rotor is driven to rotate by interaction between a magnetic field produced by windings upon passage of polyphase currents therethrough based on an electrical angle of the rotor and a magnetic field produced by permanent magnets, comprising:

memory means for storing in advance relationships between electrical angle and behavior of currents passing through polyphase windings in response to a prescribed voltage applied to a combination of the polyphase windings through which currents pass, voltage applying means for applying the voltage to the combination for shorter than a time period required for a change in electrical angle of π, the time period being a function of an upper limit speed of the motor subjected to electrical angle detection, current behavior detecting means for detecting the behavior of the current passing through each polyphase winding in response to the applied voltage, angle detecting means for determining the electrical angle of the motor in a π0–π range or a π–2π range thereof based on the behavior of the currents in the windings detected by the current behavior detecting means by referring to the relationships stored in the memory means, range ascertaining means for at least once ascertaining in which of the 0–π range and the π–2π range the electrical angle falls, and electrical angle update means for determining an initial value of the electrical angle from the detected electrical angle and a result of ascertaining by the range ascertaining means in the range 0–2π and updating the current electrical angle using the electrical angle detected thereafter by the angle detecting means, torque command value inputting means for inputting a torque command value related to torque required of the synchronous motor, and current controlling means for controlling current passed through the polyphase windings based on the electrical angle updated by the electrical angle update means and the input torque command value.

These synchronous motor drive devices detect the electrical angle using electrical angle detecting devices of the configurations described earlier and control the current passed through the polyphase windings based on the detected electrical angle and the torque command value for the synchronous motor. Since these drive devices can therefore control current passage through the windings based on accurately detected electrical angles, they can operate the synchronous motor with high efficiency.

A first synchronous motor drive method according to the invention is a drive method of a synchronous motor whose rotor is driven to rotate by interaction between a magnetic field produced by windings upon passage of polyphase currents therethrough based on an electrical angle of the rotor and a magnetic field produced by permanent magnets. The method comprises the following steps:

applying a prescribed voltage to a combination of polyphase windings through which currents pass and in advance storing in memory relationships between electrical angle and behavior of currents passing through the polyphase windings in response to the applied voltage, applying the voltage to the combination, detecting the behavior of the current passing through each polyphase winding in response to the applied voltage, determining the electrical angle of the motor between 0 and 2π based on the detected behavior of the currents in the windings by referring to the relationships stored in memory, and controlling current passed through the polyphase windings based on the determined electrical angle and a torque command value for the motor.

A second synchronous motor drive method according to the invention is a drive method of a synchronous motor whose rotor is driven to rotate by interaction between a magnetic field produced by windings upon passage of polyphase currents therethrough based on an electrical angle of the rotor and a magnetic field produced by permanent magnets. The method comprises the following steps:

applying a prescribed voltage to a combination of polyphase windings through which currents pass and in advance storing in memory relationships between electrical angle and behavior of currents passing through the polyphase windings in response to the applied voltage, repeatedly applying the voltage to the combination for a time period shorter than that required for a change in electrical angle of π, the time period being a function of an upper limit speed of the motor subjected to electrical angle detection, detecting the behavior of the current passing through each polyphase winding in response to the applied voltage, determining the electrical angle of the motor in a 0–π range or a π–2π range thereof based on the detected behavior of the currents in the windings by referring to the relationships stored in memory, at least once ascertaining in which of the 0–π range and the π–2π range the electrical angle falls, determining an initial value of the electrical angle from the detected electrical angle and a result of ascertaining by the range ascertaining means in the range 0–2π and updating the current electrical angle using the electrical angle detected thereafter, and controlling current passed through the polyphase windings based on the updated electrical angle and a torque command value for the motor.

These synchronous motor drive methods detect the electrical angle using the electrical angle detecting methods explained earlier and control the current passed through the polyphase windings based on the detected electrical angle and the torque command value for the synchronous motor. Since these drive methods can therefore control current passage through the windings based on accurately detected electrical angles, they can operate the synchronous motor with high efficiency.

DESCRIPTION OF THE PREFERRED EMBODIMENTS

Figure 1:
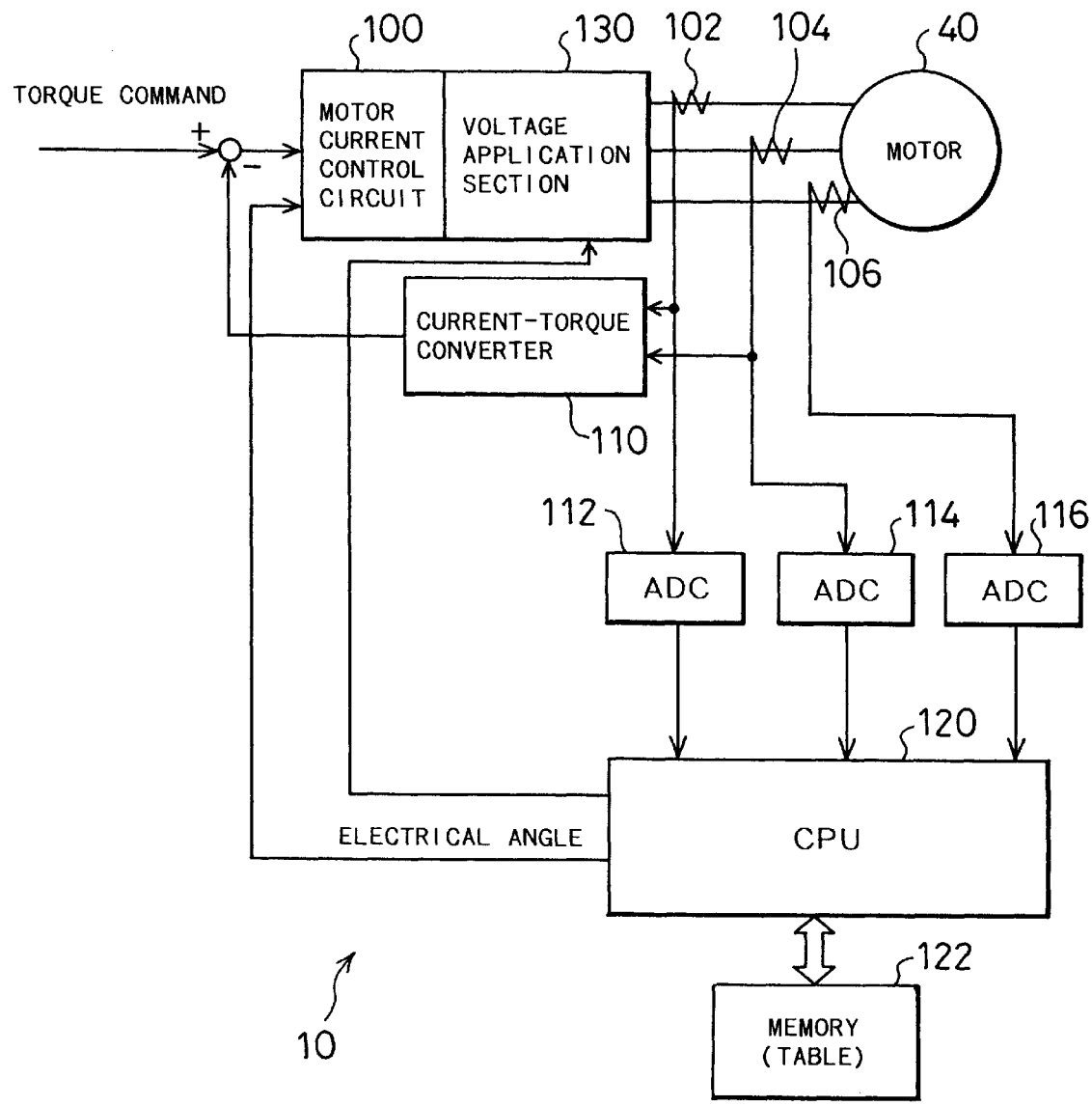
FIG. 1 is a block diagram showing the general configuration of an electrical angle detecting device that is a first embodiment of the invention.

Preferred embodiments of the invention will now be explained in order to further clarify the structure and operation of the invention. The synchronous motor 40 includes a stator 30, a rotor 50, and a casing 60 for accommodating the stator 30 and the rotor 50 therein. The rotor 50 has permanent magnets 51 through 54 attached to the circumference thereof and a rotating shaft 55 arranged on the axial center thereof. The rotating shaft 55 is rotatably supported by a pair of bearings 61 and 62 mounted on the casing 60.

Figure 2:
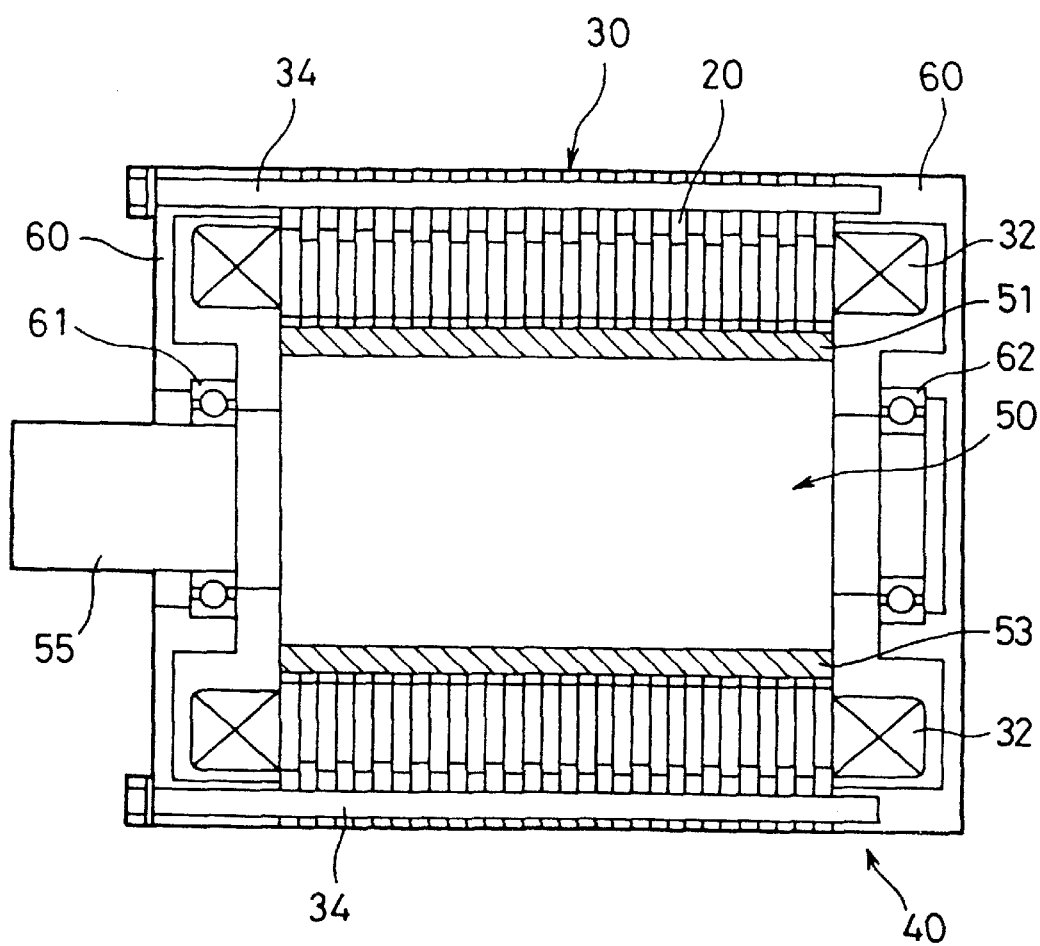
FIG. 2 a sectional view showing the structure of the three-phase synchronous motor 40 of the embodiment of FIG. 1 equipped with a stator 30.
Figure 3:
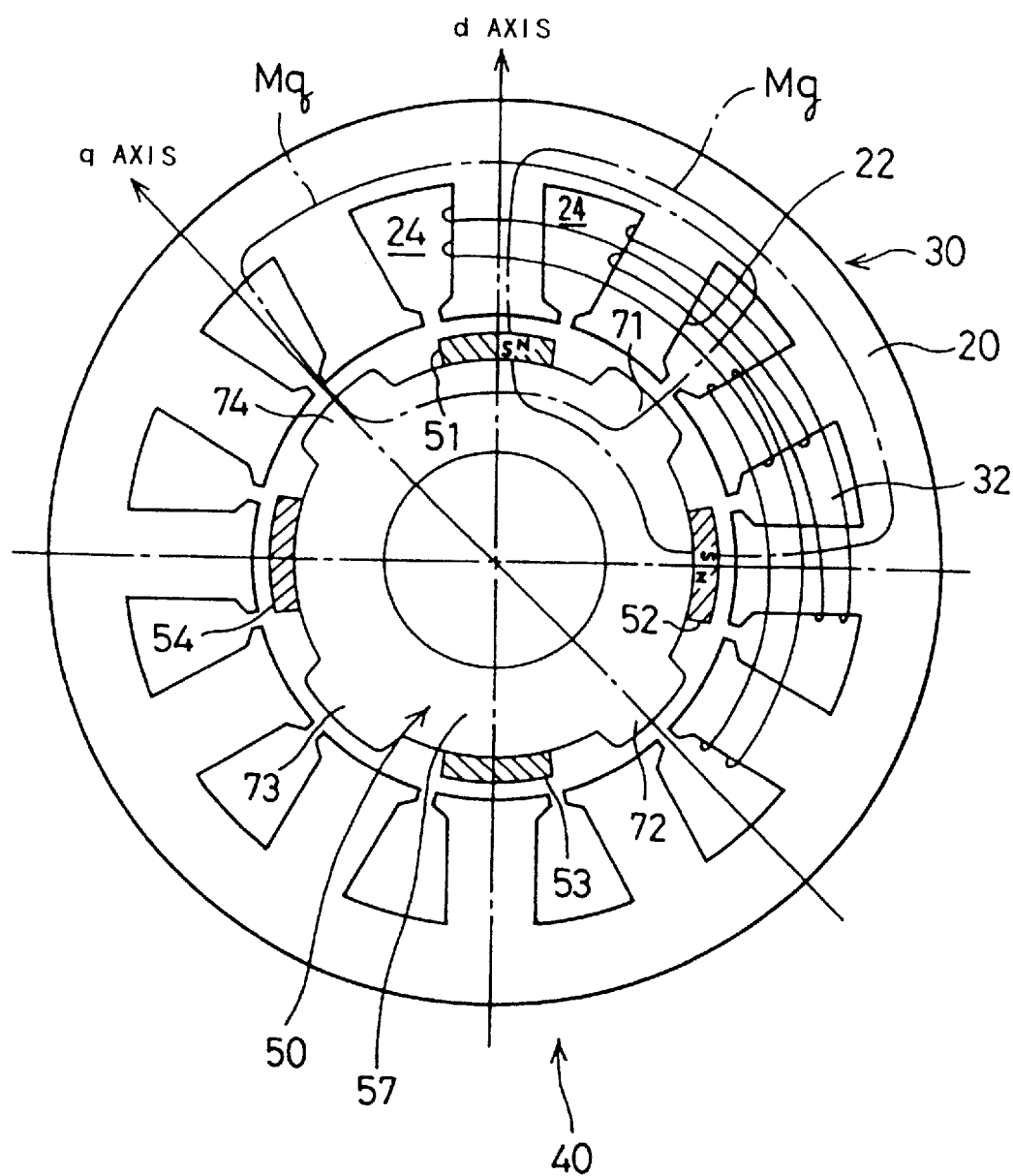
FIG. 3 is an end view showing the relationship between the stator 30 and a rotor 50 of the three-phase synchronous motor 40 used in the embodiment of FIG. 1.

The rotor 50 includes a plurality of rotor elements 57 punched from a non-directional electromagnetic steel plate and laid one upon another as shown in FIG. 3. Each rotor element 57 has four salient poles 71 through 74 arranged at 90-degree intervals as shown in FIG. 2. The salient poles 71 through 74 may be formed integrally with the rotor element 57 or otherwise formed separately and afterwards attached to the rotor element 57. Each rotor element 57 is further provided with four through holes, into which assembling pins 59 are inserted and fitted. After the plurality of rotor elements 57 are positioned by the pins 59 and laid one upon another, end plates are arranged before and after the laminate of rotor elements 57. The respective ends of the pins 59 are caulked or welded to the end plates, so that the laminate of rotor elements 57 is fixed. The laminate of rotor elements 57 forms a hollow center for receiving the rotating shaft 55 pressed therein. This completes the assembly of the rotor 50.

After the assembly of the rotor 50, the four permanent magnets 51 through 54 of a predetermined thickness are attached along the axis of the rotor 50 on the circumference of the rotor 50. The permanent magnets 51 through 54 are magnetized in the direction of thickness. When the rotor 50 is coupled with the stator 30, a magnetic path Mg is formed to pass through the adjacent permanent magnets, the rotor elements 57, and stator elements 20 (see FIG. 2).

Like the rotor elements 57, the stator elements 20 constituting the stator 30 are punched from a non-directional electromagnetic steel plate. Each stator element 20 includes a total of twelve teeth 22 as shown in FIG. 2. Each stator element 20 has, on its circumference, eight notches 34 used for welding and four key grooves 36 for receiving fixture keys. The stator 30 is assembled by positioning a laminate of plate-like stator elements 20 with a jig and welding the notches 34 formed on the circumference of the respective stator elements 20. Coils 32 for generating a revolving magnetic field in the stator 30 are wound on slots 24 formed between adjacent teeth 22.

The stator 30 thus assembled is coupled with the casing 60 by inserting fixture keys into key grooves formed on the inner surface of the casing 60 and the corresponding key grooves 36 formed on the circumference of the stator 30. The rotor 50 is then linked with the assembly of the stator 30 and the casing 60 to be rotatably supported by the bearings 61 and 62 of the casing 60. This completes the assembly of the synchronous motor 40.

When an exciting current is fed to the coils 32 on the stator 30 to generate a revolving magnetic field, a magnetic path Mq is formed to pass through the adjacent salient poles, the rotor elements 57, and the stator elements 20. In the description, an axis of the permanent magnet-based magnetic flux diametrically passing through the rotor 50 is referred to as 'd' axis, whereas that of the coil-based magnetic flux diametrically passing through the rotor 50 is referred to as 'q' axis. In this embodiment having the four poles, the d axis and the q axis are electrically arranged with the angle of 90 degrees. In other words, the q axis is in-phase with a non-load induction electromotive force E0 of the synchronous motor 40, whereas the d axis is vectrorially perpendicular to the non-load induction electromotive force E0. Each phase current I is decomposed to vectors of the d axis and the q axis. This enables the operation of the synchronous motor 40 to be easily monitored and controlled.

The structure of a motor controller 10 will now be explained with reference to FIG. 1. The motor controller 10 includes a motor current control circuit 100 for controlling the three phase (U, V, W phase) motor current of the three-phase synchronous motor 40 in response to a torque command from the outside, current detectors 102, 104 and 106 for detecting the U-phase current Iu, V-phase current Iv and the W-phase current Iw of the three-phase synchronous motor 40, a current-torque converter 110 for calculating torque value based on the detected U-phase current Iu and V-phase current Iv, three analog-digital converters (ADCS) 112, 114 and 116 for converting the same detected current values into digital data, a single-chip microprocessor (CPU) 120 for computing electrical angle, and a memory 122 for storing a table used for the electrical angle computation. The actual torque of the three-phase synchronous motor 40 is feedback controlled by adding the difference between the torque converted by the current-torque converter 110 and the torque command value to the torque command value. The output stage of the motor current control circuit 100 is provided with a voltage application section 130 for determining voltages to be applied across the motor coils for obtaining the phase currents Iu, Iv and Iw decided based on the torque command. The control output from the CPU 120 is forwarded to the voltage application section 130, thereby enabling the voltages applied to the coils of the three-phase synchronous motor 40 to be controlled by the CPU 120.

Figure 4:
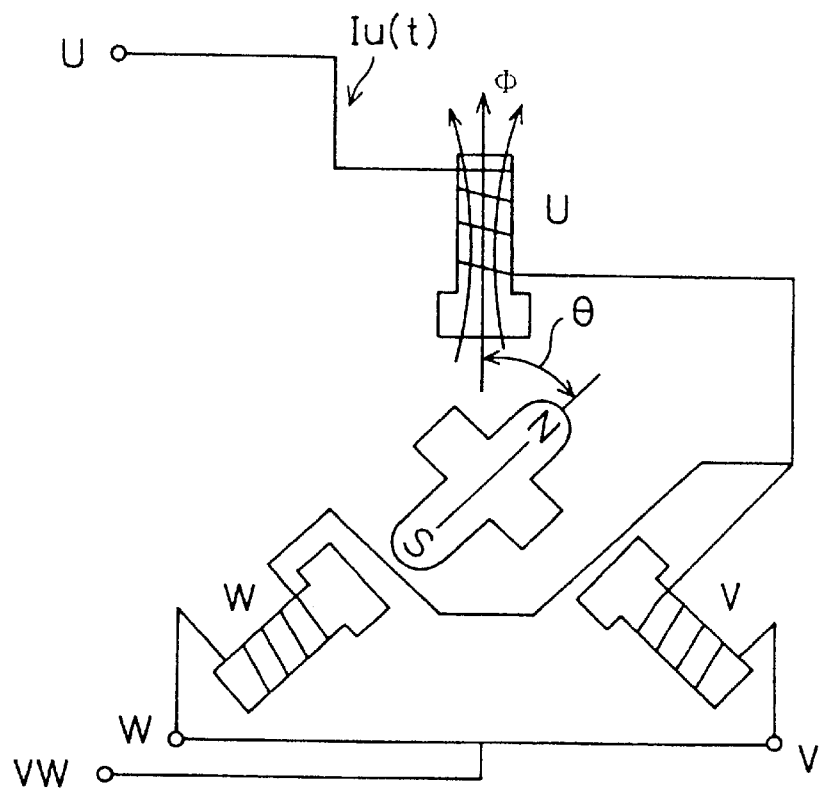
FIG. 4 is an explanatory view showing an equivalent circuit of the three-phase synchronous motor in the embodiment of FIG. 1.
Figure 5:
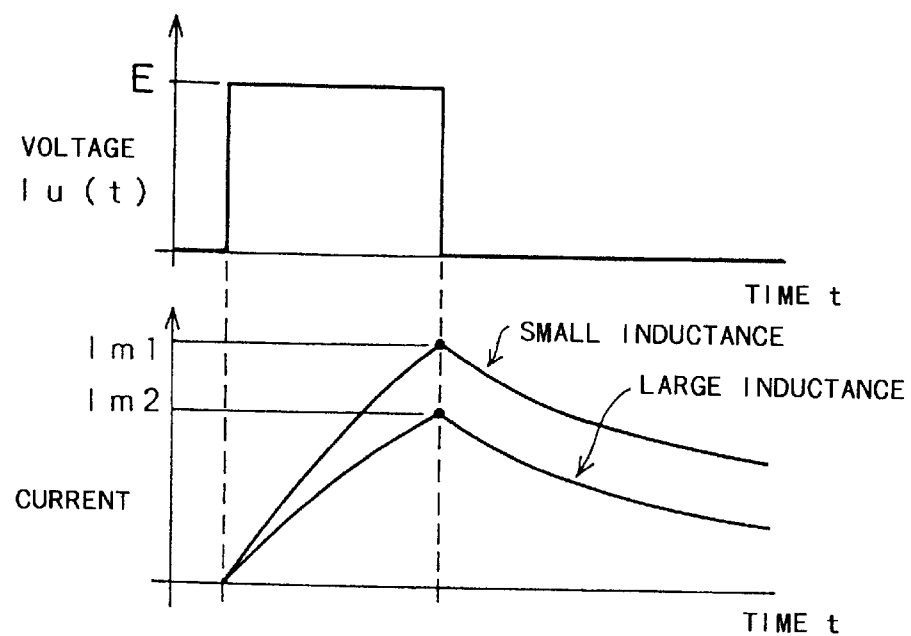
FIG. 5 is a graph showing the transient response of U-phase current Iu(t) when voltage E1 is applied across the U–VW phases.

The principle involved in, and the actual configuration used for, detecting the electrical angle of the rotor 50 in the three-phase synchronous motor 40 and motor controller 10 constituted in the foregoing manner will now be explained in detail. FIG. 4 is an equivalent circuit of the three-phase synchronous motor 40. When a prescribed voltage E1 is applied in the manner of a step function across the U and VW phases of the three-phase synchronous motor 40 as illustrated, the current Iu(t) at this time exhibits a transient response determined by the circuit inductance component L. In other words, the current Im at a prescribed time after voltage application differs depending on the value of the circuit inductance L. The current behavior depended on this difference of inductance L is shown in FIG. 5. Since the inductance L is a function of the electrical angle θ in the three-phase synchronous motor 40, it follows that the currents of the individual phases assume characteristic values dependent on the electrical angle after a given time period from the point which a certain voltage is applied across predetermined windings.

Figures 6, 7:
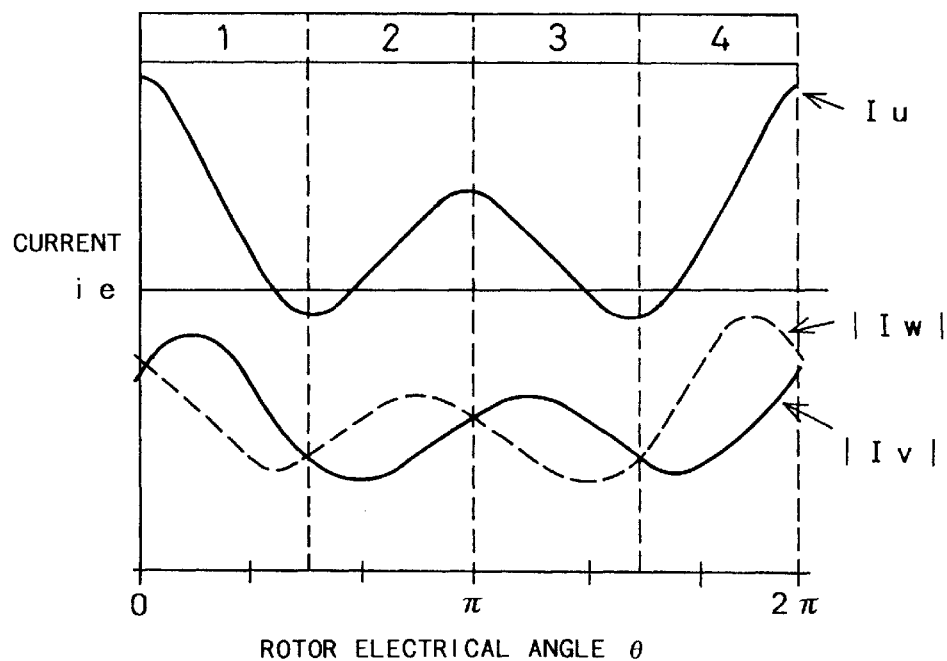
FIG. 6 is a graph showing the relationship between electrical angle and the phase currents Iu, Iv and Iw.
FIG. 7 is a map for determining the electrical angle from the combination of phase currents.
Figure 9:
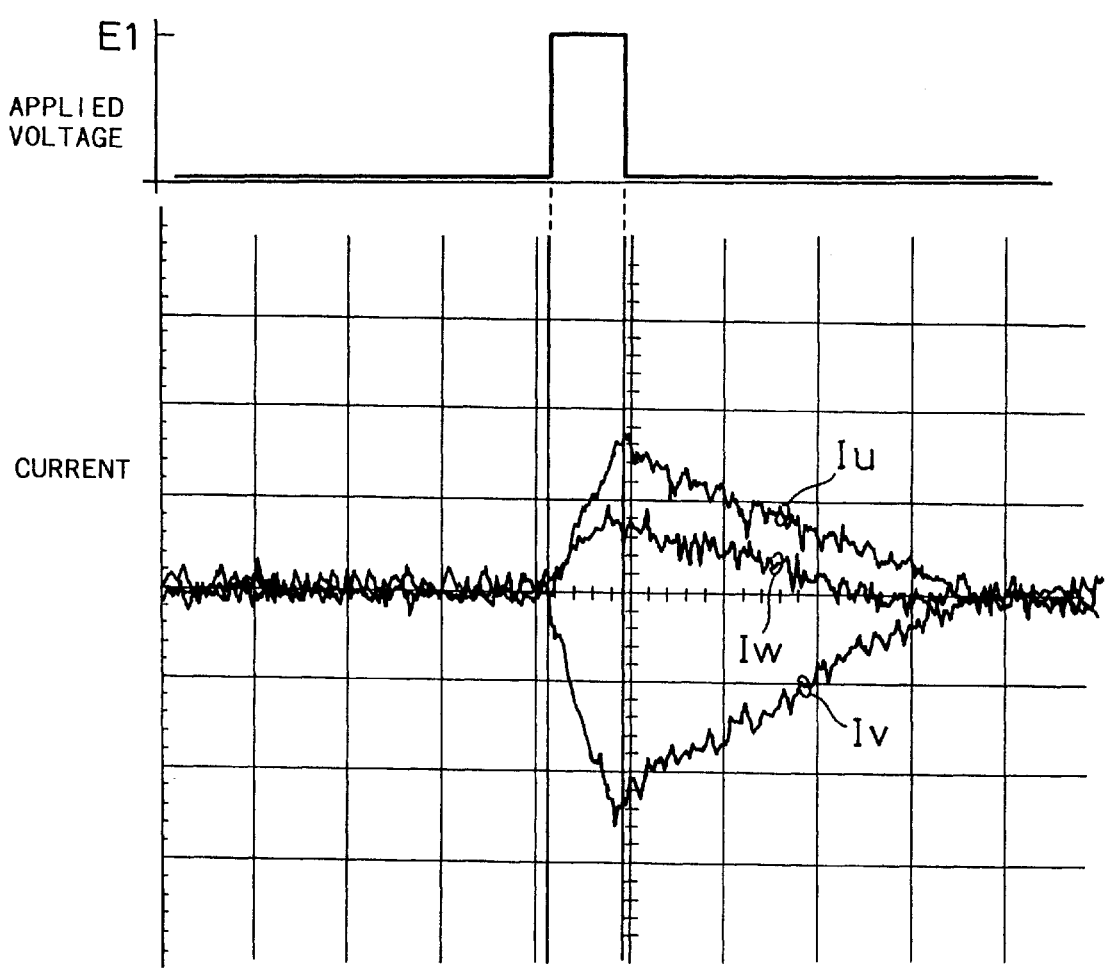
FIG. 9 is a graph showing an example of detection current relative to applied voltage E1.

The current Iu(t) flowing through the equivalent circuit shown in FIG. 4 (hereinafter called the "U-phase current") exhibits the response of Equation (1).

$$Iu(t)=\{1-exp(-Rt/L)\}E1/R \qquad (1),$$

where exp () is an exponential function, R is the impedance of the circuit and t is time. The rise of the U-phase current Iu(t) in this case becomes later as the value of the inductance L becomes greater. Therefore, if the current is measured at a given time following voltage application, the electrical angle θ at that time can, as explained above, be determined from the value of the inductance L. The current values in the individual phases were measured at various electrical angles. The results are shown in FIG. 6. FIG. 6 shows the currents in the individual phases in the case of applying voltage across the U and VW phases as shown in FIG. 4 to produce a current large enough to magnetically saturate the coils. The currents Iu, |Iv| and |Iw| were measured by the current detectors 102, 104 and 106. Since, as shown in the example of FIG. 9, negative current flows through the V phase and W phase when positive voltage is applied to the U phase, |Iv|, |Iw| are used in FIG. 7 is to indicate that the map was compiled using absolute values.

Since these measured values Iu, |Iv| and |Iw| produced magnetic saturation, the symmetry was upset and the electrical angle θ could be clearly discriminated from these measured values except in the region where the U-phase current Iu was below the current value ie. By analyzing relationship among the currents Iu, |Iv| and |Iw|, they were associated with the electrical angle to obtain the map shown in FIG. 7. In this embodiment, these relationships are ascertained and stored in the memory 122 in advance.

Figure 8:
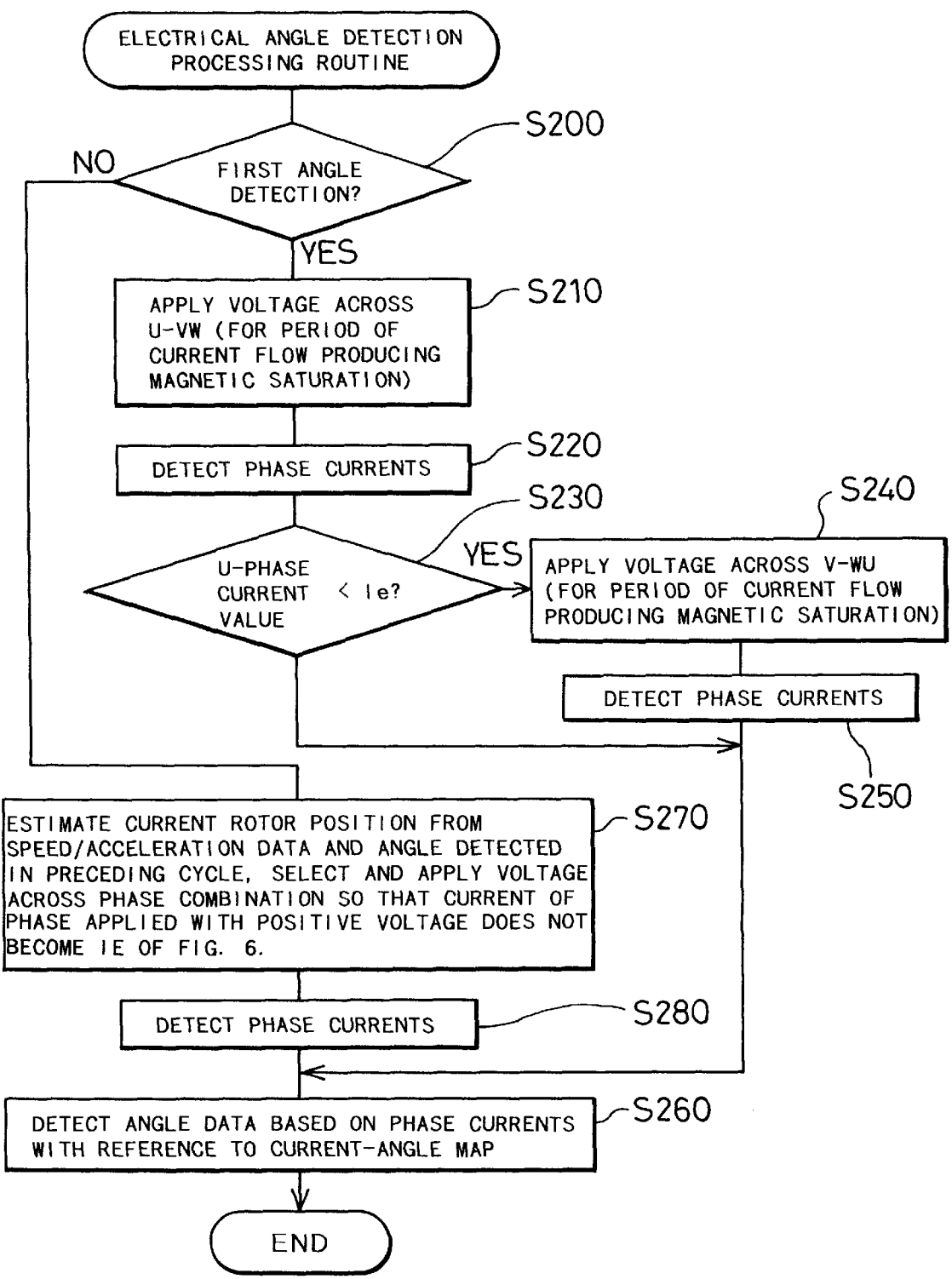
FIG. 8 is a flowchart showing an electrical angle detection processing routine executed in the embodiment of FIG. 1.

From the foregoing it was verified that, except the range which the current of the U phase is below a prescribed value ie, the electrical angle can be accurately detected by applying voltage across the U and VW phases and measuring the current flowing through the respective phases. The electrical angle detection processing conducted by the CPU 120 of this embodiment will now be explained. FIG. 8 is a flowchart showing an electrical angle detection processing routine executed by the CPU 120. It is to be understood that prior to the execution of this processing routine another processing routine is executed for applying the voltage El across windings of the three-phase synchronous motor 40, measuring the electrical angles and the currents passing through the U-phase, V-phase and W-phase coils, and compiling the map shown in FIG. 7. This map is stored beforehand in the memory 122 connected with the CPU 120.

The CPU 120 repeatedly executes the processing routine shown in FIG. 8 during periods shorter than the time required for the electrical angle to change from 0 to π at the maximum rotational speed of the synchronous motor 40. If the maximum speed of the three-phase synchronous motor 40 is 3,600 rpm, for instance, the rotor 50 makes one revolution in 16.7 milliseconds and the time required for the electrical angle to change from 0 to π is ¼ of this or about 4 milliseconds. In this embodiment, the CPU 120 utilizes timer interrupt to execute the processing routine of FIG. 8 once every 2.5 milliseconds.

Once the processing of FIG. 8 has started, the CPU 120 first checks whether this is the first detection of the electrical angle (step S200). Once the electrical angle has been detected, the rotational position of the rotor 50 at the next detection time point can be predicted to some degree. At the first detection, however, the position of the rotor 50 is completely unknown. The processing is therefore changed depending on whether or not the current detection of the electrical angle θ is the first one. When the current angle detection is found to be the first, a prescribed voltage E1 is applied across the windings U–VW (step S210). The magnitude of voltage E1 applied is determined in advance as one which produces current of a level causing magnetic saturation in the coils and is equal to the magnitude of that used to compile the map of FIG. 7. The application of the voltage across the U–VW phases produces current between the windings dependent on the inductance thereof and this current is detected by the current detectors 102, 104 and 106 (step S220). An example of the relationship between the voltage applied across the U–VW phases and the phase currents is shown in FIG. 9. As shown, when the voltage E1 is applied as a step function, the currents increase over the application period. When the application of voltage is stopped, they decrease gradually. The measurement is made just before stopping the application of the voltage E1.

Of the three current phases detected, the U-phase current is checked as to whether its value is smaller than the prescribed value ie shown in FIG. 6 (S230). As pointed out earlier, when the current in the coil on the side applied with positive voltage is below the prescribed value ie, the electrical angle θ detection accuracy is not so high. When the current in the coil applied with positive voltage is smaller than the prescribed value ie, therefore, the phase combination across which the voltage is applied is switched to the V–WU phases and the voltage E1 is applied again (step S240) and the phase currents are detected (step S250). Since the U–VW phase combination and the V–WU phase combination are electrically equivalent in the synchronous motor 40, this merely amounts to changing the phases across which the voltage is applied. The relationship between the electrical angle and the phase currents in this case is that obtained by shifting the graph of FIG. 6 by 120° (2π/3) increments. When the U-phase current Iu is at or above the prescribed value ie, steps S240 and S250 are not conducted.

The currents Iu, Iv and Iw that pass through the coils upon application of the voltage E1 in this manner are detected by the current detectors 102, 104 and 106, the values thereof are read via the ADCs 112, 114 and 116, and the electrical angle θ is determined by referring to the map of the relationships between the phase currents and the electrical angle shown in FIG. 7 (step S260).

The voltage E1 applied across the U–VW phase in this embodiment is set to a magnitude which produces current of a level causing magnetic saturation in the coils. Therefore, as shown in FIG. 6, the currents flowing through the coils are not the same in the 0–π and π–2π electrical angle ranges. So long as the current of the phase applied with positive voltage is kept at or above the prescribed value ie, therefore, the electrical angle θ can be unambiguously determined from the phase currents. After the electrical angle θ has been determined from the map of FIG. 7, the processing reaches END and is terminated.

When it is found in step S200 that electrical angle detection has already been conducted, the routine passes to step S270 in which voltage is applied across phases selected by a process that will now be explained. Specifically, the processing in S270 is premised on the fact that since electrical angle detection has already been conducted, information is available to the CPU 120 regarding the current speed (reciprocal of the change in electrical angle within a prescribed time period) and acceleration (derivative of the speed) of the synchronous motor 40. Based on this information, the approximate position of the rotor 50 is estimated and a judgment is made regarding the possibility that the estimated position is one at which the current flowing in the coil applied with positive voltage is less than the prescribed value ie. When this possibility is found to exist, voltage is applied across the phases decided beforehand. On the other hand, when it is found that current flowing through the coil applied with positive voltage may be less than the prescribed value ie, a different phase combination is selected and the voltage El is applied across the newly selected combination. Following this application of the voltage El, the phase currents are detected by the current detectors 102, 104 and 106 (step S280). In other words, the judgment of step S270 and the detection of phase currents in step S280 are equal to the processing conducted in steps S210 to S250 with actual voltage application. In step S270, the suitable phase combination is predicted on the calculation and in steps S210 to S250, the phase combination is checked by the current detection with actual voltage application.

Upon completion of the processing in step S280, the electrical angle θ is determined based on the detected currents with reference to the map of FIG. 7 (step S260). The electrical angle θ data obtained in this manner is output to the motor current control circuit 100, which uses the data as rotor 50 rotational position data for setting the phase of the signals applied to the U, V and W phases of the stator coils 32. Detection value in the first processing cycle is used for starting the motor 40. Detection value in processing cycles other than the first is used for controlling the phase current of the motor 40.

In the embodiment explained in the foregoing, application of voltage for detecting the rotor position (electrical angle) need be conducted only once per measurement. Generation of noise and vibration in conjunction with the application of voltage for electrical angle measurement can therefore reduced. Moreover, since the application of voltage for electrical angle detection as a rule need be made with respect to only one combination of windings, it suffices to conduct only one measurement of the phase currents. As a result, the probability of error owing to detection time point shift is substantially nil. Since this embodiment changes the phase combination across which voltage is applied when the current in the phase applied with positive voltage is in the vicinity of minimum, no degradation of electrical angle detection accuracy arises in any particular region. In addition, since the position of the rotor 50 at the time of measurement is estimated from its rotational speed and acceleration once the first measurement of the electrical angle has been made,, such low detection accuracy regions can be avoided in the detection of the phase currents, so that a single voltage application suffices.

Further, since this embodiment conducts electrical angle detection using the difference in inductance between windings with rotational position of the rotor 50, the electrical angle can be detected even when the rotor 50 is stationary. This enables the three-phase synchronous motor 40 to be smoothly started and controlled as desired from the start of rotation. Moreover, since the current detectors 102, 104 and 106 required for the control also serve as sensors for detecting the rotating position (electrical angle) of rotor 50, separate provision of sensors is unnecessary. Also worth noting is that no risk of starting the motor 40 arises insofar as the magnitude and application period of the voltage E1 applied across the U–VW windings are held to less than the voltage and application period at which the current produces greater than the motor starting torque. As a result, a sensorless synchronous motor controller 10 capable of detecting the electrical angle θ even in a stationary state and conducting control can be easily constituted, while a more compact and reliable controller can be realized. Further, the possibility of unwanted motor rotation at start-up is precluded.

A second embodiment of the invention will now be explained. In the first embodiment, the voltage applied across the phases corresponds to current of a level that produces magnetic saturation so that the electrical angle and the current (inductance) differ in the $0-\pi$ and $\pi-2\pi$ electrical angle ranges. Under this condition, the electrical angle is measured by simultaneously detecting the currents in the three phases. Differently from this, in the second embodiment that will now be described, the electrical angle is measured in the range of $0-\pi$ or $\pi-2\pi$ using the linear regions of the phase coils (i.e., at currents that do not produce magnetic saturation) and the electrical angle is determined by thereafter conducting an additional measurement or computation to ascertain in which range ($0-\pi$ or $\pi-2\pi$) the electrical angle falls. The second embodiment differs from the first in this point. In the following explanation, an electrical angle designated to fall either in the range $0-\pi$ or in the range $\pi-2\pi$ is distinguished from one designated unambiguously to fall in the range of $0-2\pi$ by denoting the first by $\phi$ and the second by θ.

Figure 10:
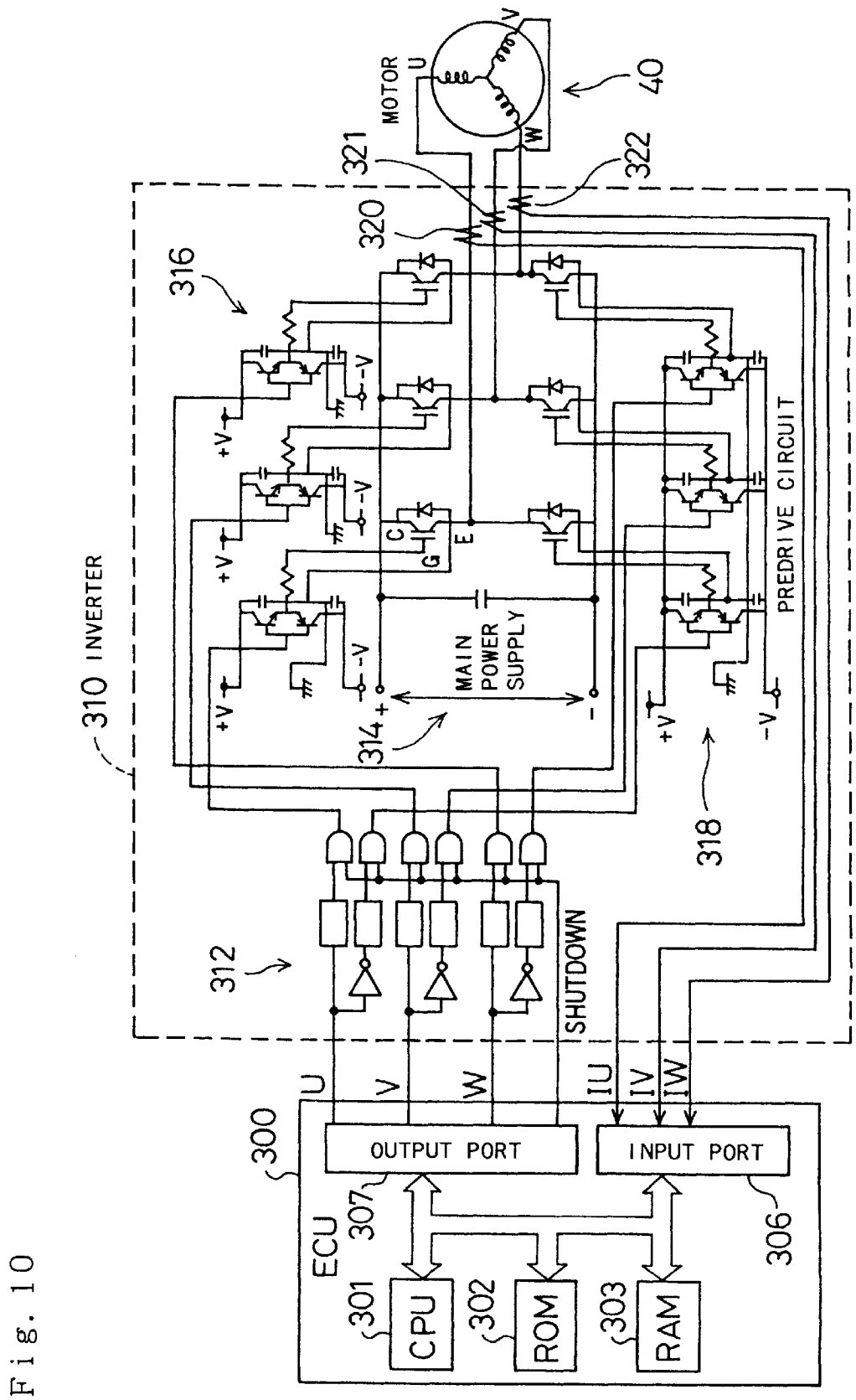
FIG. 10 is a block diagram showing the configuration of an electrical angle detecting device and a synchronous motor 40 drive device in a second embodiment of the invention.

The structure of the synchronous motor of the second embodiment and its controller will be explained first. FIG. 10 shows the general configuration of the second embodiment of the motor controller. This motor controller, which is a device for driving the three-phase synchronous motor 40, comprises an electronic control unit (ECU) 300 in charge of computation and control and an inverter 310 for actually driving the three-phase synchronous motor 40 based on control signals received from the ECU 300. The ECU 300 is an arithmetic and logic circuit of known configuration including a CPU (central processing unit) 301, ROM (read-only memory) 302, RAM (random access memory) 303 and the like. As explained later, the ECU 300 is input with the detected phase current values Iu, Iv and Iw through an input port 306, determines the electrical angle, and outputs control signals to the inverter 310 through an output port 307 to thereby control the ON times of the individual phases.

The inverter 310 comprises an interface section 312 for interfacing with the ECU 300, a main drive circuit 314 including six switching transistors of large power capacity and operating to directly control current passage through the phases of the three-phase synchronous motor 40, predrive circuits 316 and 318 for driving the source side and the sink side of the main drive circuit 314, and current detectors 320, 321 and 322 for detecting the currents of the U-phase, V-phase and W-phase. A main power source for driving the three-phase synchronous motor 40 is connected to the points designated by the symbols "+" and "–" in the figure, while stabilized positive and negative control power sources within the inverter 310 are connected to the points designated by the symbols "+V" and "–V" through respective power source circuits not shown in the figure.

The interface section 312 is a circuit for receiving signals from the ECU 300 and outputting signals required by the predrive circuits 316, 318. It is specially equipped with a deadtime generating circuit for generating deadtime to prevent the pair of transistors of the main drive circuit 314 from turning on simultaneously. It is also provided with a gate for cutting off all signals to the predrive circuits 316, 318 when the ECU 300 outputs a SHUTDOWN signal.

The predrive circuits 316, 318 are circuits for switching the large-capacity switching transistors of the main drive circuit 314 at high speed. Insulated gate bipolar transistors (IGBTS) are used as the large power capacity switching transistors of this embodiment.

Figure 11:
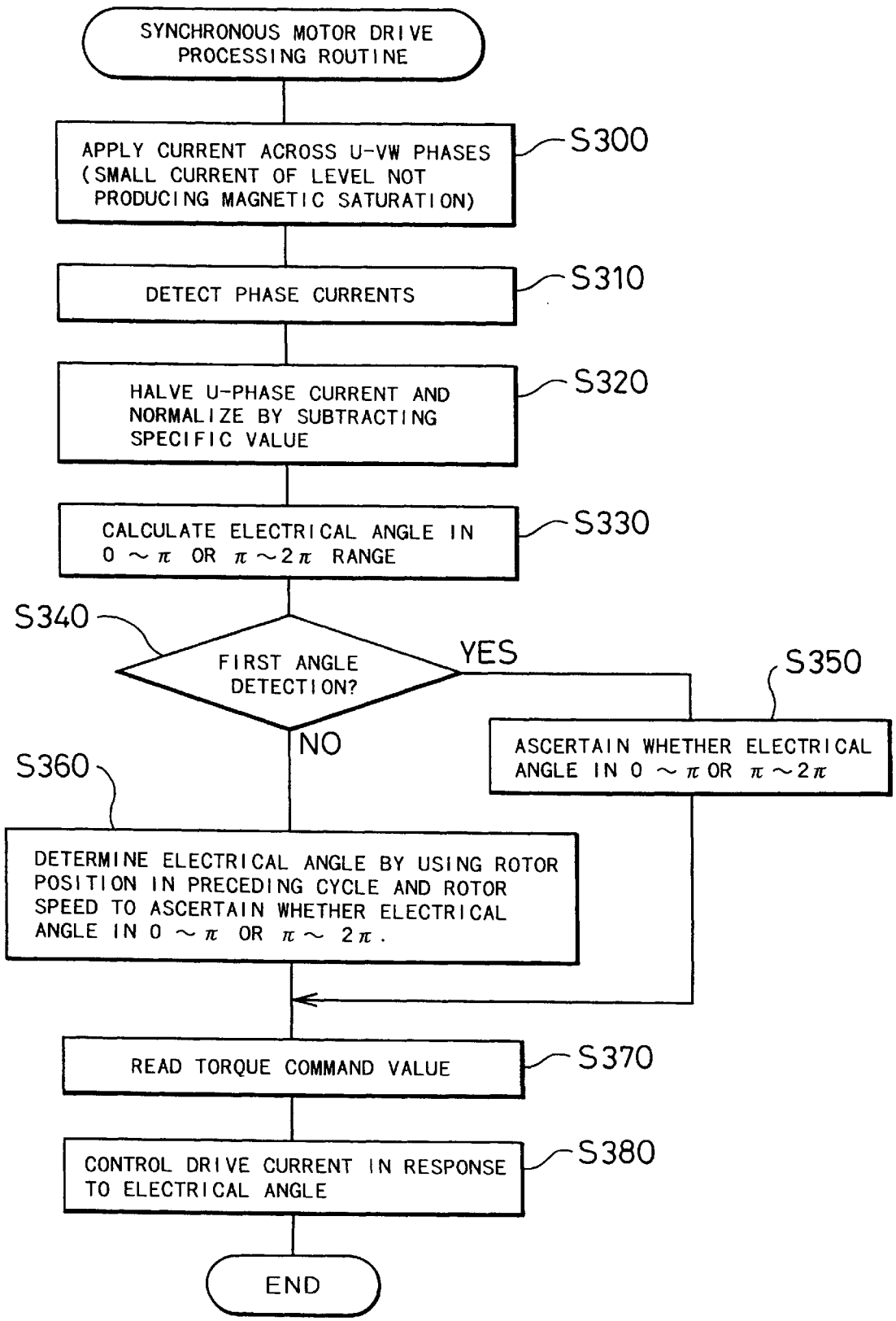
FIG. 11 is a flowchart showing a synchronous motor controlling routine in the second embodiment.

In this second embodiment, the electrical angle detecting device is established in the ECU 300. The processing conducted by the ECU 300 in its function as the synchronous motor controller of the second embodiment is shown in FIG. 11. Steps S300 to S360 of this routine correspond to the electrical angle detection method. The method of electrical angle detection in this embodiment will be explained first. The electrical angle detecting device established in the ECU 300 first applies voltage across the U–VW phases (step S300). The phase currents produced in the phase coils by this voltage are measured (step S310). The voltage applied across the U–VW phases at this time is determined beforehand so that the current will be of a level not producing magnetic saturation in the phase coils. The magnitude of the voltage applied across the U–VW phases differs from that in the first embodiment. The map storing the relationships between the phase currents produced by this voltage and the electrical angle therefore also differs from that in the first embodiment.

Next, the detected phase currents are used to normalize the data (step S320). This normalization is conducted as follows. The currents produced in the respective phases by step S300 are plotted against the electrical angle of the rotor in the graph of FIG. 12. As shown, positive current flows through the U phase applied with positive voltage and negative current flows through the V and W phases applied with negative voltage. Since, as is clear from FIG. 4, the current in the U phase is equal to the sum of the currents in the V and W phases, the current in the U phase is double the average of the currents in the other two phases. The detected current Iu of the U phase is therefore halved and the detected current Iu of the U phase is shifted so that the average value of the halved current becomes zero. In addition, the detected currents Iv and Iw of the V and W phases are also shifted so that the average currents become zero. As a result, currents Iu, Iv and Iw offset from each other by 120° (2π/3) as shown in FIG. 13 are obtained. This is the normalization processing. Since the voltage applied across the phases corresponds to a current level not producing magnetic saturation, the currents Iu, Iv and Iw obtained by the normalization are substantially identical in waveform.

Figure 12:
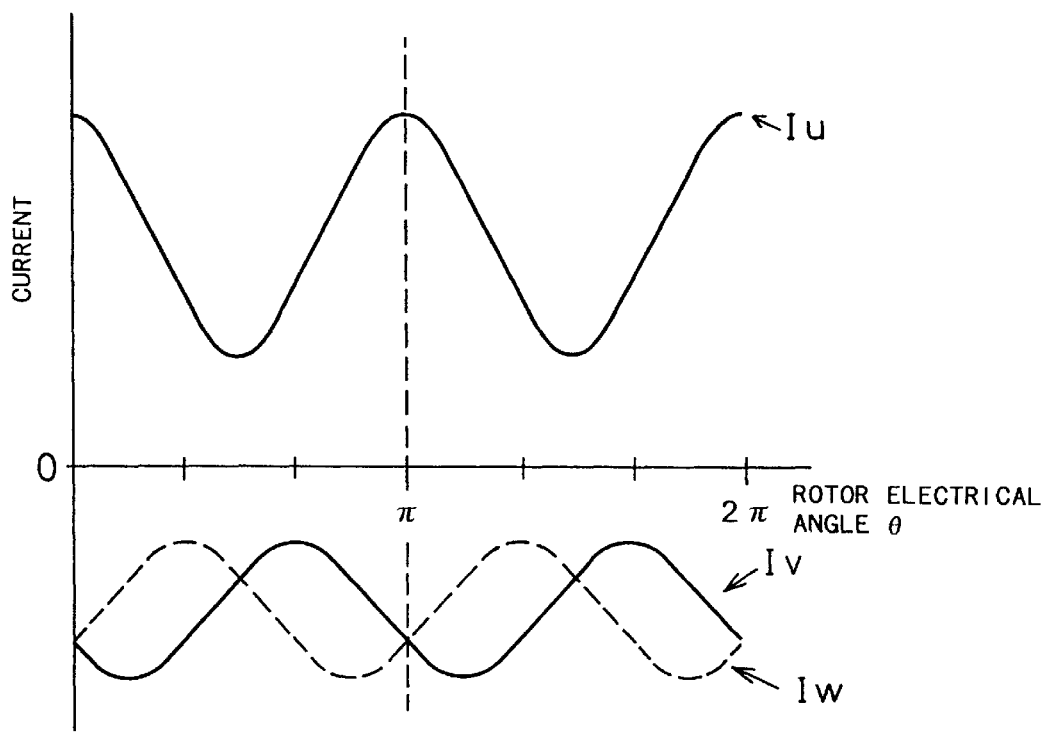
FIG. 12 is a graph showing the phase currents in the second embodiment.
Figure 13:
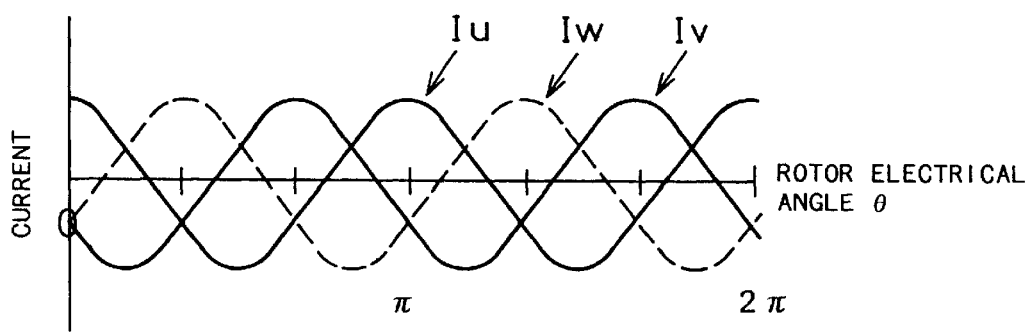
FIG. 13 is a graph showing normalized phase currents.

As is clear from FIG. 12, the relationship among the phase currents Iu, Iv and Iw is identical in the 0–π and π–2π electrical angle ranges. This means that the range in which the electrical angle falls cannot be ascertained only from the three measured phase currents Iu, Iv and Iw. The electrical angle φ is therefore first calculated as being in one or the other of the ranges (step S330 of FIG. 11), a check is then made as to whether this is the first angle detection (step S340), and if it is, the method explained in the following is used to ascertain whether the electrical angle falls in the 0–π range or the π–2π range (step 350). On the other hand, if angle detection has already been carried out, the range in which the current rotor position (electrical angle) falls is ascertained from the position of the rotor 50 in the preceding cycle and its speed (step S360). As was explained regarding the first embodiment, if the electrical angle detection is repeatedly conducted at prescribed intervals, the position of the rotor 50 in the next cycle can be approximately ascertained from the current speed of the synchronous motor 40. The range within which the electrical angle falls can therefore be ascertained without risk of error. Through the foregoing steps the electrical angle θ can be found within the range of 0–2π.

In the following explanation, the portion of the foregoing processing in which voltage is applied across prescribed phases and computation is conducted to determine the electrical angle φ in the 0–2π range or the π–2π range will be referred to as the "first stage" and the portion thereof in which the range in which the electrical angle falls is discriminated will be referred to as the "second stage." These two stages can be treated as independent processing stages. The assignee's Japanese Patent Application No. 6-238500 (Japanese Layed Open Gazette No. 7-177788) teaches various methods and devices for conducting these stages. These first and second stages is disclosed in Japanese Layed Open Gazette No. 7-177788, the disclosure of which is incorporated herein by reference. Among these, an example of each stage will be briefly explained in the following on the understanding that the other disclosed methods can of course also be applied.

<Regarding the first stage>

In the foregoing embodiment, the map of the electrical angle φ and the three-phase coil currents Iu, Iv and Iw prepared and stored in memory beforehand is used to determine the electrical angle φ in one of the ranges 0–π and π–2π. Another method usable for the first stage is as follows. This method utilizes the fact that, as shown in FIG. 13, the normalized currents across the phases are offset from each other by 120° and that, therefore, within the range of electrical angles between 0° and 180°, for example, the relationship among the maximum currents Iu, Iv and Iw in the respective phases changes every 30°. A total of six combinations therefore exists:

Segment 1 (0°–30°)→Iu>Iv>Iw
Segment 2 (30°–60°)→Iv>Iu>Iw
Segment 3 (60°–90°)→Iv>Iw>Iu
Segment 4 (90°–120°)→Iw>Iv>Iu
Segment 5 (120°–150°)→Iw>Iu>Iv
Segment 6 (150°–180°)→Iu>Iw>Iv Among the maximum currents in each segment, the one of intermediate magnitude (e.g., Iv in segment 1, Iu in segment 2, . . . ) can be approximated by a straight line within the segment. Adopting this expedient, if the average value of the maximum phase currents is defined as Iav, the linearly approximated current in the nth segment as In and the slope of the straight line as m, it holds that the electrical angle φ can be obtained from Equation (2).

$$\phi = (n-1) \times 30 + 15 + sgn \times (Iav - In) \times m \tag{2}$$

where sgn=1: segment 1, 3, 5; −1: segment 2, 4, 6. In other words, the value of sgn is 1 in odd-numbered segments and −1 in even-numbered segments. Further, In=Iv in segments 1, 4, In=Iu in segments 2, 5, and In=Iw in segments 3, 6.

<Regarding the second stage>

Figure 14:
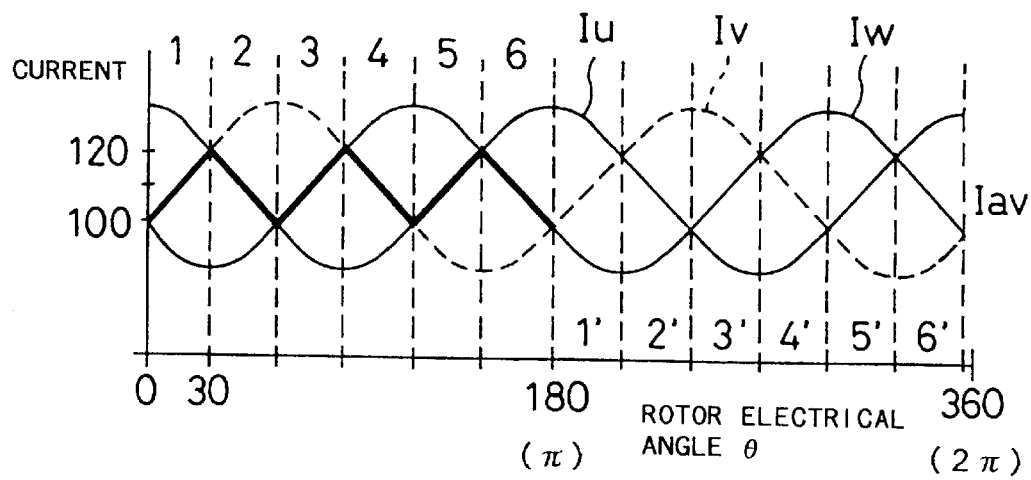
FIG. 14 is diagram for explaining an approximation method for computing the electrical angle from the phase currents Iu, Iv and Iw.

While in the first stage the voltage applied across the phase coils was limited so as to produce magnetic flux of a level not causing magnetic saturation, the second stage utilizes the asymmetry produced by magnetic saturation to determine in which of the 0–π(180°) and π(180°)–2π(360°) ranges the electrical angle φ obtained in the first stage falls, namely, to determine whether, in FIG. 14, it falls in one of the 1, 2, 3, 4, 5, 6 segments or in one of the 1', 2', 3', 4', 5', 6' segments.

Figure 15:
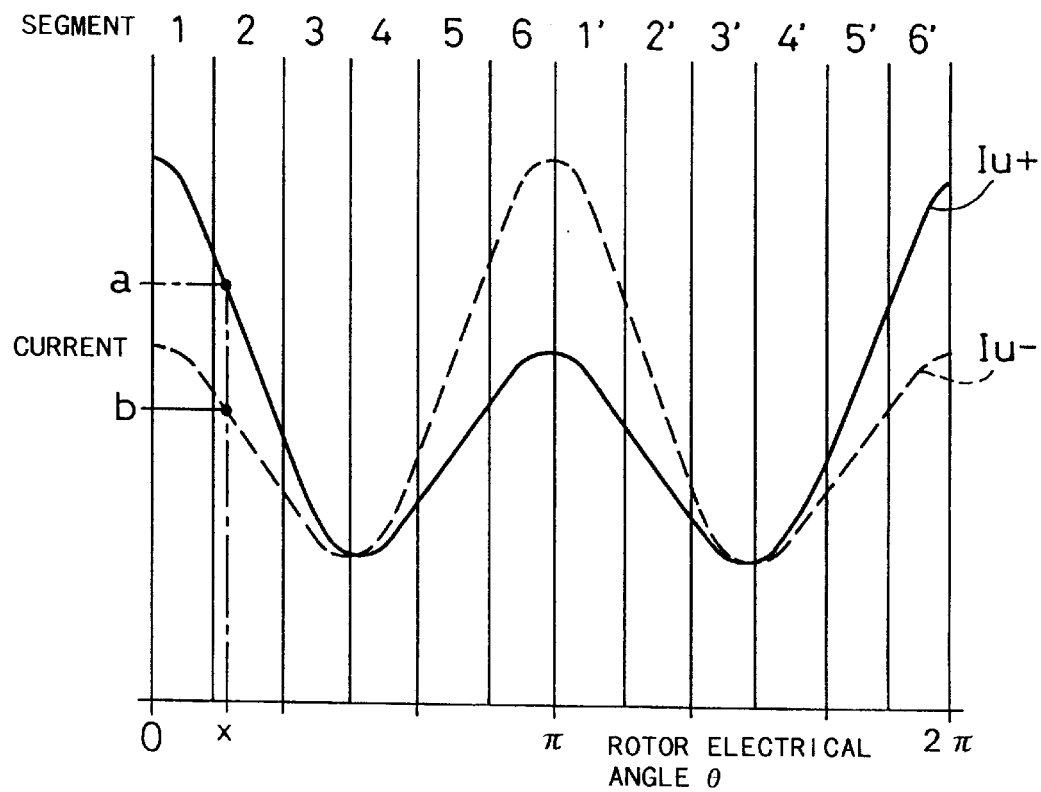
FIG. 15 is a graph showing the relationship between coil currents Iu+ and Iu− for ascertaining the range to which the electrical angle falls.

In the explanation of the first embodiment, an example was shown in FIG. 6 of the coil current (hereinafter denoted as Iu+) when a voltage producing current of a level producing magnetic saturation is applied across the U–VW phases for a prescribed period of time with the U phase positive and the V and W phases negative. On the other hand, FIG. 15 shows the coil current Iu−, reversed in polarity and superimposed on the coil current Iu+, when the U phase is negative and the V and W phases positive. As shown, viewed relative to the six segments 1 to 6 of the foregoing example of the first stage, the coil current Iu+ is higher than the coil current Iu− in segments 1 to 3 and segments 4' to 6' but is lower than the coil current Iu− in segments 4 to 6 and segments 1' to 3'. Segments 1 and 1' (and, similarly, 2 and 2' etc.) can therefore be discriminated by measuring the coil currents Iu+ and Iu−.

Figure 16:
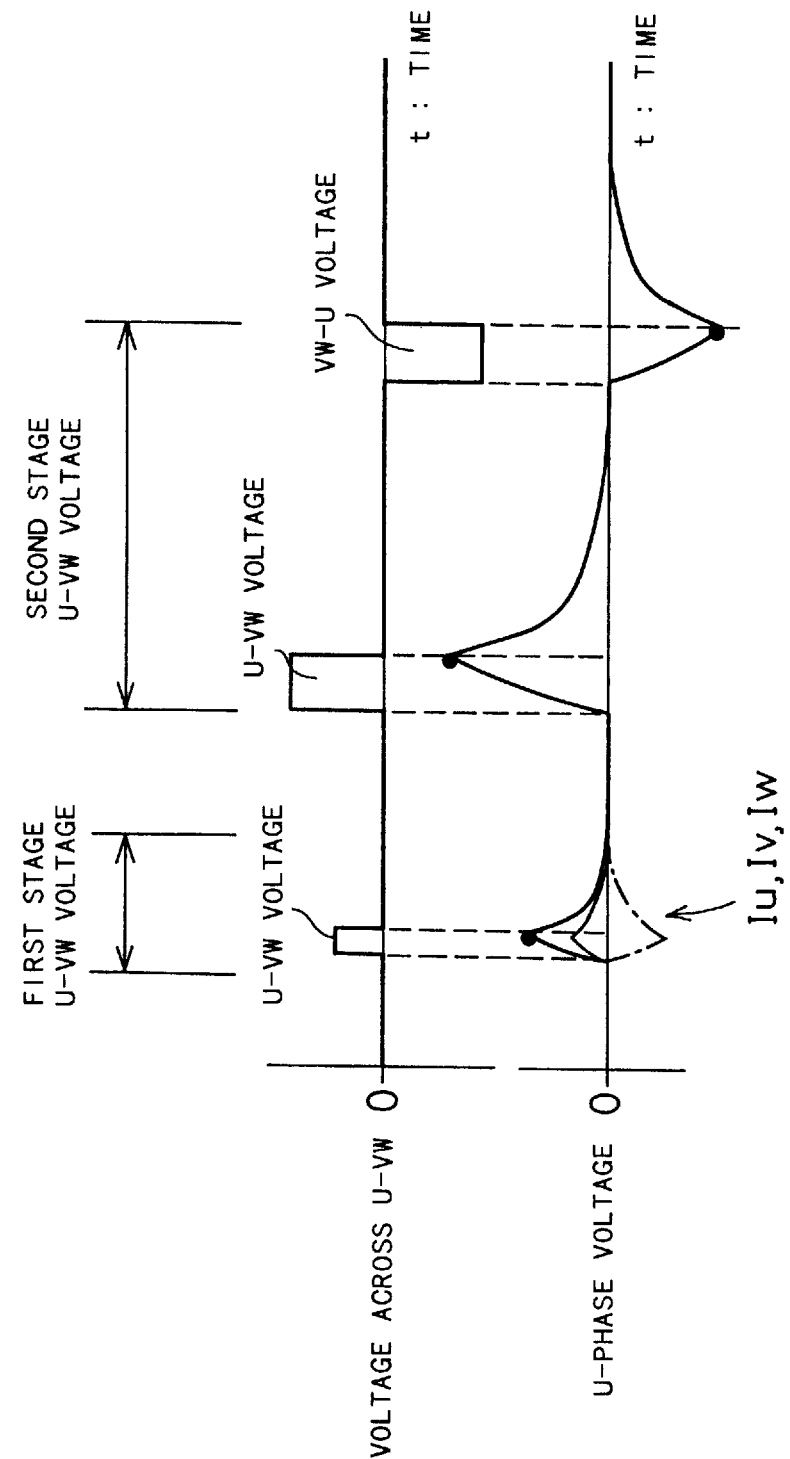
FIG. 16 is a graph showing the measuring method in the second embodiment.
Figure 17A:
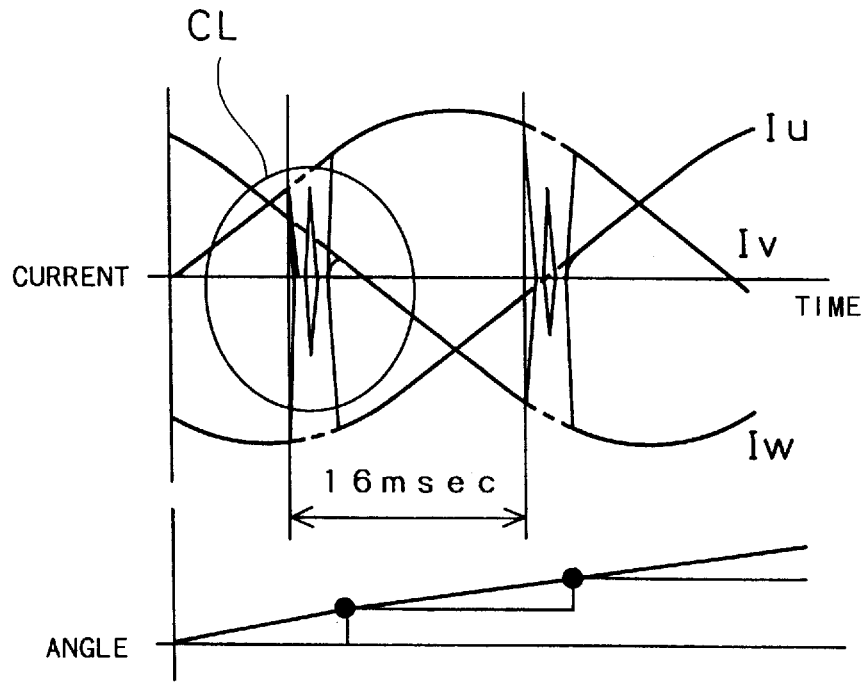
FIGS. 17A and 17B are graphs showing the prior method of an electrical angle measurement.
Figure 17B:
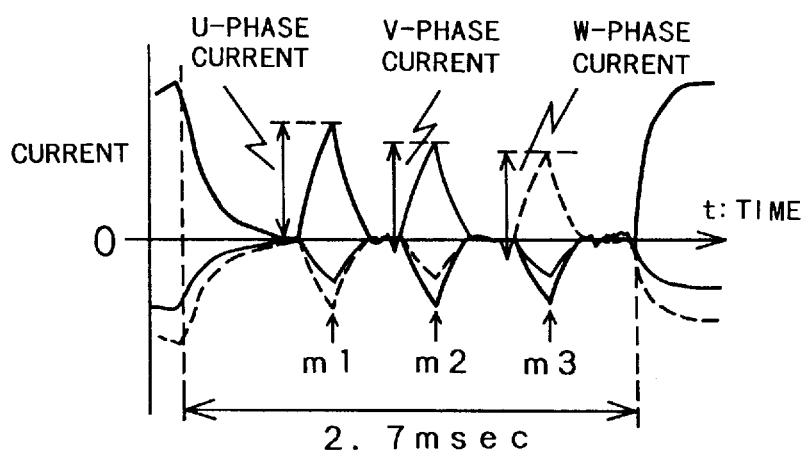

Thus, by combining the first stage and the second stage, it is possible to ascertain the electrical angle θ (position of the rotor 50) within the range of 0–2π. FIG. 16 illustrates an actually conducted measurement. In the first electrical angle measurement, as shown in FIG. 16, a voltage producing current of a level not causing magnetic saturation was first applied across the U–VW phases and the coil currents Iu, Iv and Iw at this time were detected by the current detectors 320–322. The processing of the first stage was conducted based on the detection result to ascertain the electrical angle in the range 0–π or the range π–2π. A high voltage of a level causing magnetic saturation was then applied across the same U–VW phases and the U-phase coil current Iu+ at that time was detected. Voltage reversed in polarity was further applied across the same phases and the U-phase coil current Iu− was detected. This corresponds to the second stage. After completion of the second stage processing, the segment in which the electrical angle θ fell was ascertained and used in conjunction with the processing result in the first stage to ascertain the electrical angle.

When the electrical angle detection is not the first one, the range in which the electrical angle is present can be estimated at each successive detection time point from the electrical angle θ detected one cycle earlier. This makes it possible to ascertain the electrical angle θ without conducting the second stage processing. Based on the so-obtained electrical angle θ, the ECU 300 reads the torque command value (step S370 in FIG. 11) and controls the drive current of the synchronous motor 40 through the inverter 310 (step S380). This embodiment therefore enables the three-phase synchronous motor 40 to be efficiently operated in response to the input torque command value from the stopped state to the rotating state. Since, as in the first embodiment, the application of voltage for electrical angle detection as a rule need be made only once, generation of noise and torque fluctuation owing to application of the measurement voltage can be markedly suppressed. In addition, the voltage applied for processing in the first stage can be made smaller than the voltage applied in the first embodiment. This is further advantageous from the points of suppressing noise and reducing torque fluctuation.

The present invention has thus been shown and described with reference to specific embodiments. However, it should be noted that the present invention is in no way limited to the details of the described arrangements but various changes and modifications may be made without departing from the scope of the appended claims.

For example, in an electrical angle detecting device or the like it is possible for the frequency of the voltage applied by the voltage applying means to be set higher than the frequency of the alternating voltage applied to the coils for driving the synchronous motor. In this case, the measurement can be conducted without discontinuing the application of the alternating voltage for motor driving.

What is claimed is:

1. An electrical angle detecting device of a synchronous motor whose rotor is driven to rotate by interaction between a magnetic field produced by windings upon passage of polyphase currents therethrough and a magnetic field produced by permanent magnets, said electrical angle detecting device comprising:

memory means for storing in advance relationships between electrical angle and behavior of currents passing through polyphase windings in response to a prescribed voltage applied to a combination of said polyphase windings through which currents pass, voltage applying means for applying said voltage to said combination, said voltage including only one voltage pulse used for detecting an electrical angle, current behavior detecting means for detecting said behavior of said currents passing simultaneously through each of said polyphase windings in a range of 0 to 2π in response to said only one voltage pulse applied by said voltage applying means as a unique combination of electric currents passing through said polyphase windings, and electrical angle computing means for determining said electrical angle of said motor between 0 and 2π based on said behavior of said currents in said windings detected by said current behavior detecting means by referring to said relationships stored in said memory means.

2. An electrical angle detecting device of a synchronous motor whose rotor is driven to rotate by interaction between a magnetic field produced by windings upon passage of polyphase currents therethrough and a magnetic field produced by permanent magnets, said device comprising:

memory means for storing in advance relationships between electrical angle and behavior of currents passing through polyphase windings in response to a prescribed voltage applied to a combination of said polyphase windings through which currents pass, voltage applying means for applying a voltage to said combination for shorter than a time period required for a change in electrical angle of π, said time period being a function of an upper limit speed of said motor subjected to electrical angle detection, said voltage including only one voltage pulse used for detecting an electrical angle, current behavior detecting means for detecting said behavior of said currents passing simultaneously through each of said polyphase windings in response to said only one voltage pulse which has been applied, angle detecting means for determining said electrical angle of said motor in a 0–π range or a π–2π range thereof based on said behavior of said currents in said windings detected by said current behavior detecting means by referring to said relationships stored in said memory means, range ascertaining means for at least once ascertaining in which of said 0–π range and said π–2π range said electrical angle falls, and electrical angle update means for determining an initial value of said electrical angle from said detected electrical angle and a result of ascertaining by said range ascertaining means in the range 0–2π and updating said current electrical angle using said electrical angle detected thereafter by said angle detecting means.

3. An electrical angle detecting device according to claim 2 wherein said voltage applying means is means for applying voltage of a magnitude smaller than that which produces current causing said windings to magnetically saturate in a prescribed time period.

4. An electrical angle detecting method for detecting an electrical angle of a synchronous motor whose rotor is drive to rotate by interaction between a magnetic field produced by windings upon passage of polyphase currents therethrough and a magnetic field produced by permanent magnets, said method comprising:

(a) applying a prescribed voltage to a combination of polyphase windings of said synchronous motor through which currents pass and in advance storing in memory relationships between electrical angle and behavior of currents passing through said polyphase windings in response to said applied voltage, (b) applying a voltage, which includes only one voltage pulse used for detecting an electrical angle, to said combination, (c) detecting said behavior of said currents passing simultaneously through each of said polyphase windings in a range of 0 to $2\pi$ in response to said only one voltage pulse which has been applied as a unique combination of electrical currents passing through said polyphase windings, and (d) determining said electrical angle of said motor between 0 and $2\pi$ based on said detected behavior of said currents in said windings by referring to said relationships stored in memory.

5. An electrical angle detecting method for detecting an electrical angle of a synchronous motor whose rotor is driven to rotate by interaction between a magnetic field produced by windings upon passage of polyphase currents therethrough and a magnetic field produced by permanent magnets, said method comprising:

(a) applying a prescribed voltage, which includes only one voltage pulse used for detecting an electrical angle, to a combination of polyphase windings through which currents pass a plurality of times and in advance storing in memory relationships between electrical angle and corresponding behavior of currents passing through said polyphase windings in response to said voltage applied a plurality of times, (b) repeatedly applying said voltage, which includes only one voltage pulse used for detecting an electrical angle, to said combination for a time period shorter than that required for a change in electrical angle of $\pi$, said time period being a function of an upper limit speed of said motor subjected to electrical angle detection, (c) detecting said behavior of said currents passing simultaneously through each of said polyphase windings in response to each of said only one voltage pulse which has been applied by said step of repeatedly applying, (d) determining said electrical angle of said motor in a $0-\pi$ range or a $\pi-2\pi$ range thereof based on said detected behavior of said currents in said windings by referring to said relationships stored in memory, (e) at least once ascertaining in which of said $0-\pi$ range and said $\pi-2\pi$ range said electrical angle falls, and (f) determining an initial value of said electrical angle from said detected electrical angle and a result of ascertaining by said range ascertaining step in the range $0-2\pi$ and updating said current electrical angle using said electrical angle detected thereafter.

6. An electrical angle detecting method according to claim 5, wherein said application of said voltage in step (b) is conducted by applying a voltage to said windings of a magnitude smaller than that which produces current causing said windings to magnetically saturate in a prescribed time period.

7. A synchronous motor drive device of a synchronous motor whose rotor is driven to rotate by interaction between a magnetic field produced by windings upon passage of polyphase currents therethrough based on an electrical angle of said rotor and a magnetic field produced by permanent magnets, comprising:

memory means for storing in advance relationships between electrical angle and behavior of currents passing through polyphase windings in response to a prescribed voltage applied to a combination of said polyphase windings through which currents pass, voltage applying means for applying said voltage to said combination, said voltage including only one voltage pulse for detecting an electrical angle, current behavior detecting means for detecting said behavior of said currents passing through each of said polyphase windings in a range of 0 to $2\pi$ in response to said only one voltage pulse applied by said voltage applying means as a unique combination of electric currents passing through said polyphase windings, electrical angle computing means for determining said electrical angle of said motor between 0 and $2\pi$ based on said behavior of said currents in said windings detected by said current behavior detecting means by referring to said relationships stored in said memory means, torque command value inputting means for inputting a torque command value related to torque required of said synchronous motor, and current controlling means for controlling current passed through said polyphase windings based on said electrical angle determined by said electrical angle computing means and said input torque command value.

8. A synchronous motor drive device of a synchronous motor whose rotor is driven to rotate by interaction between a magnetic field produced by windings upon passage of polyphase currents therethrough based on an electrical angle of said rotor and a magnetic field produced by permanent magnets, comprising:

memory means for storing in advance relationships between electrical angle and behavior of currents passing through polyphase windings in response to a prescribed voltage applied to a combination of said polyphase windings through which currents pass, voltage applying means for applying said voltage to said combination, said voltage including only one voltage pulse for detecting an electrical angle, for shorter than a time period required for a change in electrical angle of $\pi$, said time period being a function of an upper limit speed of said motor subjected to electrical angle detection, current behavior detecting means for detecting said behavior of said currents passing through each of said polyphase windings in response to said only one applied voltage pulse, angle detecting means for determining said electrical angle of said motor in a $0-\pi$ range or a $\pi-2\pi$ range thereof based on said behavior of said currents in said windings detected by said current behavior detecting means by referring to said relationships stored in said memory means, range ascertaining means for at least once ascertaining in which of said 0–π range and said π–2π range said electrical angle falls, and electrical angle update means for determining an initial value of said electrical angle from said detected electrical angle and a result of ascertaining by said range ascertaining means in the range 0–2π and updating said electrical angle using said electrical angle detected thereafter by said angle detecting means, torque command value inputting means for inputting a torque command value related to torque required of said synchronous motor, and current controlling means for controlling current passed through said polyphase windings based on said electrical angle updated by said electrical angle update means and said input torque command value.

9. A synchronous motor drive method of a synchronous motor whose rotor is driven to rotate by interaction between a magnetic field produced by windings upon passage of polyphase currents therethrough based on an electrical angle of said rotor and a magnetic field produced by permanent magnets, said method comprising:

applying a prescribed voltage to a combination of polyphase windings through which currents pass and in advance storing in memory relationships between electrical angle and corresponding behavior of currents passing through said polyphase windings in response to said applied voltage, applying said voltage to said combination which includes only one voltage pulse for detecting an electrical angle, detecting said behavior of said current passing simultaneously through each of said polyphase windings in a range of 0 to 2π in response to said only one applied voltage pulse as a combination of electric currents passing through said polyphase windings, determining said electrical angle of said motor between 0 and 2π based on said detected behavior of said currents in said windings by referring to said relationships stored in memory, and controlling current passed through said polyphase windings based on said determined electrical angle and a torque command value for said motor.

10. A synchronous motor drive method of a synchronous motor whose rotor is driven to rotate by interaction between a magnetic field produced by windings upon passage of polyphase currents therethrough based on an electrical angle of said rotor and a magnetic field produced by permanent magnets, said method comprising:

applying a prescribed voltage to a combination of polyphase windings through which currents pass and in advance storing in memory relationships between electrical angle and corresponding behavior of currents passing through said polyphase windings in response to said voltage applied a plurality of times, repeatedly applying said voltage which includes only one voltage pulse used for detecting an electrical angle to said combination for a time period shorter than that required for a change in electrical angle of π, said time period being a function of an upper limit speed of said motor subjected to electrical angle detection, detecting said behavior of said current passing simultaneously through each of said polyphase windings in response to each of said only one voltage pulse which has been applied by said step of repeatedly applying, determining said electrical angle of said motor in a 0–π range or a π–2π range thereof based on said detected behavior of said currents in said windings by referring to said relationships stored in memory, at least once ascertaining in which of said 0–π range and said π–2π range said electrical angle falls, determining an initial value of said electrical angle from said detected electrical angle and a result of ascertaining by said range ascertaining step in the range 0–2π and updating said electrical angle using said electrical angle detected thereafter, and controlling current passed through said polyphase windings based on said updated electrical angle and a torque command value for said motor.

* * * * *

UNITED STATES PATENT AND TRADEMARK OFFICE
CERTIFICATE OF CORRECTION

PATENT NO.  : 5,854,548
DATED       : Dec. 29, 1998
INVENTOR(S) : Yoshiaki Taga, et al It is certified that error appears in the above-identified patent and that said Letters Patent is hereby corrected as shown below:

On the title page, item [75], the first Inventor's city should be:

--Aichi-ken;--

Signed and Sealed this

Twenty-seventh Day of July, 1999

Attest:

Q. TODD DICKINSON

*Attesting Officer*      *Acting Commissioner of Patents and Trademarks*